(12) United States Patent
Vidalat et al.

(10) Patent No.: US 11,135,630 B2
(45) Date of Patent: Oct. 5, 2021

(54) METHOD FOR PRODUCING A DENSIFIED MATERIAL FROM A COMPLEX FILM, PRODUCTION INSTALLATION AND USE

(71) Applicant: ARMOR, Nantes (FR)

(72) Inventors: Fanny Vidalat, Nantes (FR); Nicolas Vannieuwenhuyse, La Haye Fouassière (FR); Christophe Derennes, Saint Philbert de Grand Lieu (FR)

(73) Assignee: ARMOR, Nantes (FR)

( * ) Notice: Subject to any disclaimer, the term of this patent is extended or adjusted under 35 U.S.C. 154(b) by 49 days.

(21) Appl. No.: 16/336,128

(22) PCT Filed: Sep. 25, 2017

(86) PCT No.: PCT/EP2017/074159
§ 371 (c)(1),
(2) Date: Mar. 25, 2019

(87) PCT Pub. No.: WO2018/055146
PCT Pub. Date: Mar. 29, 2018

(65) Prior Publication Data
US 2020/0023555 A1      Jan. 23, 2020

(30) Foreign Application Priority Data

Sep. 26, 2016   (FR) .................................... 16 59038

(51) Int. Cl.
*B29B 9/06* (2006.01)
*B29B 7/42* (2006.01)
(Continued)

(52) U.S. Cl.
CPC ................ *B09B 3/00* (2013.01); *B29B 7/421* (2013.01); *B29B 7/429* (2013.01); *B29B 7/823* (2013.01);
(Continued)

(58) Field of Classification Search
CPC ......... B09B 3/00; B09B 5/00; B29B 17/0026; B29B 7/421; B29B 7/428; B29B 7/429;
(Continued)

(56) References Cited

U.S. PATENT DOCUMENTS 6,494,390 B1    12/2002   Khait et al.
2006/0034961 A1   2/2006   Starlinger-Huemer et al.
(Continued)

FOREIGN PATENT DOCUMENTS

CN           101535018 A         9/2009
CN           108472849 A         8/2018
(Continued)

OTHER PUBLICATIONS

Machine translation of JP2014124855 (Year: 2014).*
(Continued)

*Primary Examiner* — Robert J Grun
(74) *Attorney, Agent, or Firm* — Nixon & Vanderhye

(57) ABSTRACT

A method for producing a densified material includes: obtaining a film including at least one first layer of plastic material and one second layer with a composition distinct from the first layer, the first layer having a first melting temperature, or obtaining pieces of such a film; compressing the obtained film or the obtained pieces of film through at least one die of at least one extruder, and obtaining a profile of densified material, the extruder including at least one rotary endless screw pushing the obtained film or pieces of film along a screw axis; and optionally cutting the profile in order to obtain granules of densified material, the compression step being carried out at a maximum compression temperature for the obtained film or pieces of film, the maximum compression temperature being less than the first melting temperature. Also disclosed are installation and use of the densified material.

14 Claims, 2 Drawing Sheets

Figure 1:
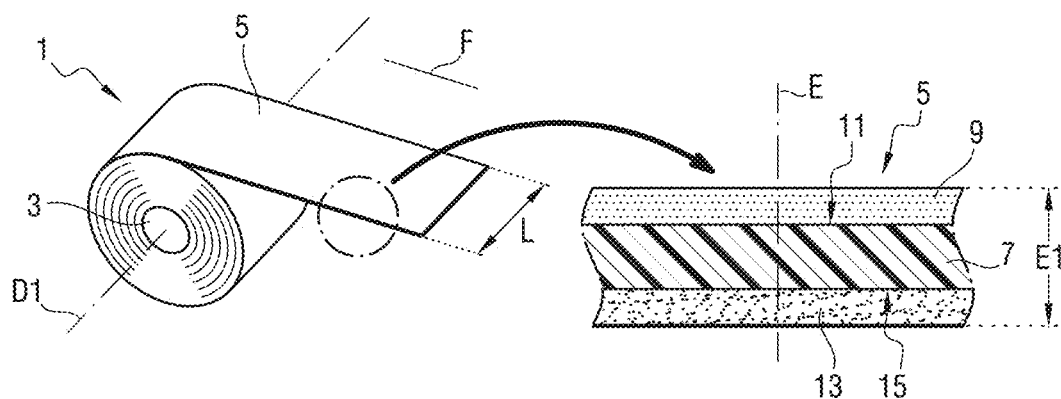

(51) Int. Cl.
  *B29B 7/82* (2006.01)
  *B29B 17/00* (2006.01)
  *B09B 3/00* (2006.01)
  *B29C 48/08* (2019.01)
  *B29C 48/405* (2019.01)
  *B29C 48/41* (2019.01)
  *B29C 48/00* (2019.01)
  *B29C 48/285* (2019.01)
  *B29C 48/92* (2019.01)
  *B29B 9/12* (2006.01)
  *B29K 67/00* (2006.01)
  *B29K 105/26* (2006.01)

(52) U.S. Cl.
  CPC ............ *B29B 7/826* (2013.01); *B29B 9/06* (2013.01); *B29B 9/12* (2013.01); *B29B 17/0026* (2013.01); *B29C 48/0017* (2019.02); *B29C 48/022* (2019.02); *B29C 48/08* (2019.02); *B29C 48/2888* (2019.02); *B29C 48/405* (2019.02); *B29C 48/41* (2019.02); *B29C 48/92* (2019.02); *B29K 2067/003* (2013.01); *B29K 2105/26* (2013.01)

(58) Field of Classification Search
  CPC .......... B29B 7/823; B29B 7/826; B29B 9/06; B29B 9/12; B29C 48/0017; B29C 48/022; B29C 48/08; B29C 48/2888; B29C 48/405; B29C 48/41; B29C 48/92; B29K 2067/003; B29K 2105/26; B29L 2031/3005; B29L 2031/3032; Y02W 30/62

See application file for complete search history.

(56) References Cited

U.S. PATENT DOCUMENTS

2014/0027548 A1    1/2014  Yamazaki
2014/0339726 A1*  11/2014  Guven .................. C08J 11/06
                                                        264/140

FOREIGN PATENT DOCUMENTS

FR        2796879 A1    2/2001
FR        2870477 A1   11/2005
JP        2014/124855 A   7/2014
WO    2006/040536 A1   4/2006

OTHER PUBLICATIONS

International Search Report, dated Oct. 25, 2017, from corresponding PCT application No. PCT/EP2017/074159.
French Search Report, dated Jan. 24, 2017, from corresponding FR application No. FR 1659038.

* cited by examiner

METHOD FOR PRODUCING A DENSIFIED MATERIAL FROM A COMPLEX FILM, PRODUCTION INSTALLATION AND USE

BACKGROUND OF THE INVENTION

Field of the Invention

The present invention relates to the preparation, processing, recycling and use of complex film scrap (at least two layers), in particular those comprising inked PET (polyethylene terephthalate).

In particular, the invention relates to a method and a plant designed for preparation and densification for the recycling of inked PET film waste resulting from the production of thermal transfer films, as well as rolls of used thermal transfer film.

The invention also relates to products obtainable by this method, and possible uses of these products.

Description of Related Art

So-called "thermal transfer" technology that is used in a widespread and massive way throughout the world, makes it possible to print barcodes, batch numbers . . . etc. on many media (labels, flexible packaging . . . ), of good quality, in a sustainable way and in all types of environments. The production and use of thermal transfer film rolls as consumables for thermal transfer printers generates production waste of thermal transfer films and used thermal transfer film rolls.

Thermal transfer film waste is generally of three different kinds:
  small rolls (film wrapped around a tube made of cardboard or plastic material) of heterogeneous dimensions (width, diameter, etc.), whose width is, for example, between 30 and 170 mm,
  "Jumbo rolls", i. e. rolls whose width is for example 1010 mm and whose diameter, for example, is between 450 and 700 mm, and
  bulk film.

The film is, for example, in the form of a thermoplastic "PET support film" (polyethylene terephthalate) representing between 69% and 76% by weight of the film, with an ink layer composed of waxes, resins and at least a pigment, for example carbon black, representing between 24% and 31% by weight, and a "backing" composed of silicone derivatives representing less than 0.3% by weight. The thickness of the thermal transfer film is very small, for example between 8 and 10 µm.

Current treatment solutions for thermal transfer film waste are disposal (landfill) or energy recovery solutions. Due to their widespread use, the recycling of thermal transfer film waste represents a major economic and environmental issue.

It appears that all the traditional methods for transformation and use of thermoplastics do not accept the presence of cardboard. For thermal transfer film waste in the form of rolls and "Jumbo rolls", it is therefore necessary to separate the tubes from the film. There are methods of separation by guillotining or pulling for large rolls. However, there is no technically and economically satisfactory solution for rolls of small dimensions such as the small rolls mentioned above.

As part of their research, the Applicant has carried out grinding tests for thermal transfer film waste. It has been found that, for particle sizes greater than 1500 µm, the ground material obtained is very volatile and that its flow, for example in hoppers, is problematic. Such a product is therefore difficult to work.

It is also known to transform thermoplastic materials at temperatures above the melting temperature of semi-crystalline polymers or at the glass transition temperature for amorphous polymers that is traditionally between 150 and 300° C.

However, the presence of a high proportion of inks in the thermal transfer film waste creates problems. For example, the inks emerge from the interstices of the equipment used.

There are also de-inking methods using chemical baths or mechanical scraping. The purpose of these methods is to obtain a de-inked PET film which would then be recycled via conventional recycling channels. The disadvantage of these de-inking methods is to create new waste containing the inks and liquid waste. In addition, methods using solvents have toxicological and environmental impacts. The de-inking methods are therefore not currently used for the treatment of thermal transfer film waste, at least not on an industrial scale. In addition, there are very few applications so far for the de-inked PET so obtained.

JP-A-2014124855 describes a method for recycling used thermal transfer ribbons and the use of recycling products obtained as a black coloring agent mixed with plastics.

This multi-step method provides separation of the films from their cardboard support or tube. The ribbon wastes so obtained are then introduced into a tank equipped with a rotary worm screw for densification by water. The material is fixed by adding water in the form of small agglomerated granules. The agglomerate undergoes an additional micronization step to be used, in particular, as a black coloring agent mixed with other plastics.

However, the agglomeration step in the tank is performed discontinuously in batches. In addition, the nature of thermal transfer films, thin and very strongly inked, hinders the agglomeration step. The result is an appearance of black carbon, and the release of a great deal of gas.

It therefore appears that the existing methods for preparation or processing for recycling are not suitable for certain types of complex films, in particular in the case of very strongly inked and very fine thermal transfer films.

BRIEF SUMMARY OF THE INVENTION

An object of the invention is, therefore, to provide an improved method for producing a directly-usable densified material obtained from complex film wastes, especially thermal transfer film waste, while limiting the number of steps in order to encourage recycling, as well as possible uses of the material so obtained.

For this purpose, the invention relates to a method for producing a densified material, wherein the method comprises at least the following steps:
  obtaining a film comprising at least a first layer of plastic material, for example PET, and a second layer of composition distinct from the first layer, for example ink, wherein the first layer has a first melting point, or obtaining pieces of such a film,
  compressing the film or pieces of film so obtained, by means of at least one die of at least one extruder, and obtaining at least one section of densified material, wherein the extruder comprises at least one rotary worm screw to push the resulting film or pieces of film so obtained along a screw axis with respect to the extruder, and optional cutting of the section to obtain granules of densified material, wherein the compression step is performed at a maximum compression temperature of the film or pieces of film so obtained, wherein the maximum compression temperature is lower than the first melting point.

According to particular embodiments, the method comprises one or more of the following characteristics, taken in any technically feasible combination:

- the second layer has a second melting temperature lower than or equal to the first melting temperature, preferably lower than by least 10° C., wherein the temperature of the compression step is between the second melting temperature minus 60° C. and the second melting temperature plus 60° C., preferably between the second melting temperature minus 35° C. and the second melting temperature plus 35° C.;
- the worm screw comprises at least one cutting element for cutting the film or the pieces of film so obtained, and/or at least one portion in which the worm screw has an internal diameter perpendicular to the screw axis, wherein the internal diameter increases along the axis of the screw in order to compress the film or the pieces of film so obtained during the densification step;
- the worm screw is part of a system with two conical screws of the extruder;
- the die has a compression height of between 1.5 and 15;
- the extruder defines a sheath through which the worm screw passes, wherein the worm screw has a nominal diameter, while the threads of the sheath are separated by a distance greater than or equal to 0.001 times the nominal diameter; and
- the method also comprises the following steps: obtaining the film by unwinding a roll, wherein the unwinding is carried out through suction of the film or by direct conveyance of the film by the worm screw, and continuous feeding of the film to the extruder.

The invention also relates to a plant for producing a densified material, wherein the plant comprises:

- a source of a film or pieces of film, wherein the film comprises at least a first layer of plastic material, for example PET, and a second layer with a composition that is distinct from that of the first layer, for example ink,
- at least one extruder that is designed to compress the film or the pieces of film, wherein the extruder comprises at least one exit die for at least one section of densified material, and at least one rotary worm screw to push the film or the pieces of film along a screw axis with respect to the die, wherein the extruder is designed to perform compression at a maximum compression temperature of the film or pieces of film, and wherein the maximum compression temperature is lower than the first melting temperature, and
- optionally at least one cutting device that is designed to produce granules of densified material from the section.

The invention also relates to granules of densified material capable of being obtained by a method as described above, wherein a bed of these granules of densified material has a bulk density greater than 120 kg/m$^3$, while the granules of densified material each have a smaller dimension greater than 2 mm.

The invention also relates to a use of at least one section of densified material or granules of densified material obtained by a method as described above, wherein the section or the granules are used as:

a. dye for a thermoplastic material,
b. load within a thermoplastic matrix,
c. raw material in the formulation of thermosets,
d. raw material in concrete, cement, bitumen, or paint,
e. raw material in the production of cushioning products,
f. filler for filling material for an empty space,
g. release agent in a thermoplastic matrix,
h. compatibilizing agent in a mixture of thermoplastic materials to increase the compatibility of the materials with each other, or
i. viscosity modifier within a thermoplastic matrix.

BRIEF DESCRIPTION OF THE SEVERAL VIEWS OF THE DRAWING(S)

Figure 2:
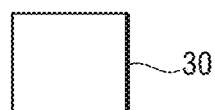
Figure 3:
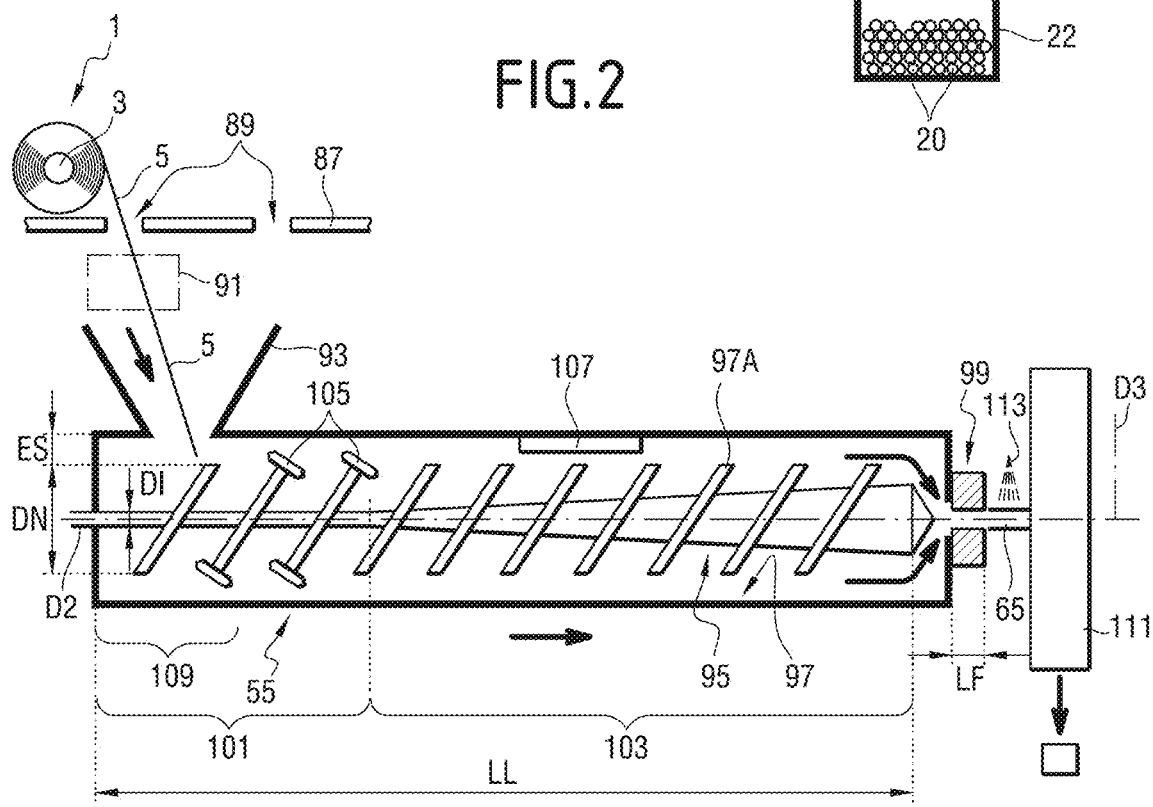
Figure 4:
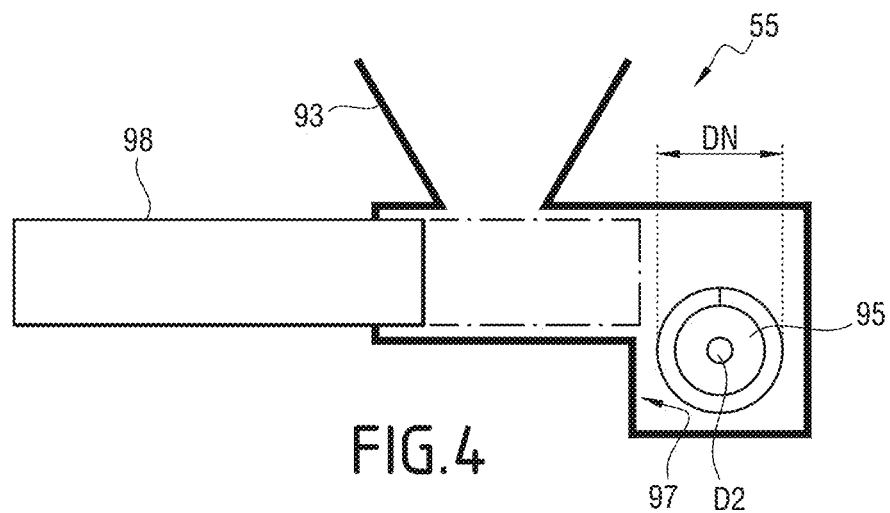
Figure 5:
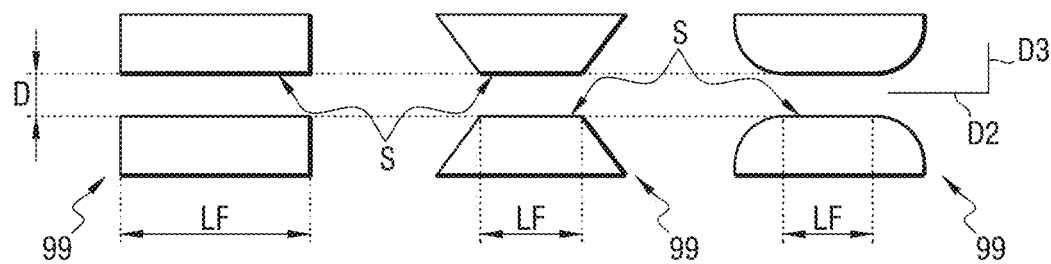
Figure 6:
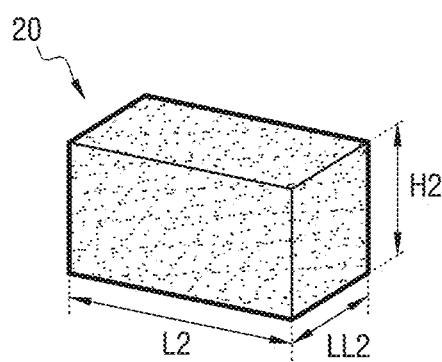

The invention will be better understood upon reading the description which follows, given solely by way of example and with reference to the appended drawings, wherein:

FIG. 1 shows a schematic view of a thermal transfer film roll,

FIG. 2 shows a diagram representing a method according to the invention making it possible to transform the roll represented in FIG. 1 into a densified material that may be used for different applications, FIG. 3 shows a schematic view of a plant according to the invention, FIG. 4 shows a schematic axial view of the plant shown in FIG. 3, FIG. 5 shows a schematic view of the die of the extruder shown in FIGS. 3 and 4, and FIGS. 6 and 7 show perspective views of granules of densified material obtained using the plant shown in FIGS. 3 and 5.

DETAILED DESCRIPTION OF THE INVENTION

Thermal Transfer Film Roll

With reference to FIG. 1, a roll 1 of thermal transfer film is described. The roll 1 is for example a "small roll" in the sense defined above.

The roll 1 has a tube 3 with a tube axis D1 and a film 5 wound around the tube and around the tube axis.

The roll 1 is, for example, a used roll, i.e. a roll whose film has been used in a thermal transfer printing machine (not shown), and then wound on the tube 3.

According to a variant not shown, the roll 1 may be a roll which has not been used but which it is desired to recycle. For example, it may be production waste resulting from a thermal transfer film production method.

The tube 3 is, for example, made of cardboard.

The film 5 has a width L along the tube axis D1, for example between 30 and 170 mm. As may be seen in the enlargement in the right-hand part of FIG. 1, the film 5 comprises, in this example, a first layer 7 of plastic material, and a second layer 9 disposed on a first face 11 of the first layer.

The film 5 is said to be "complex" because it comprises at least two layers of distinct natures.

The film 5 advantageously comprises a third layer 13 disposed on a second face 15 of the first layer, wherein the second face is opposite to the first face in a direction E that is locally perpendicular to the film.

The film 5 has a small thickness E1 in the direction E, of less than 3 mm, and preferably less than 10 µm.

Generally speaking, "film" is understood to mean an object of flat appearance, capable of being wound, and extending in a main direction F. For example, the film 5, in the unrolled state, is at least 50 times more long in the main direction F as wide with respect to the tube axis D1.

According to variants not shown, the film 5 comprises only the first layer 7 and the second layer 9, or these layers and at least one more, all of which are distinct.

The first layer 7 is made of thermoplastic polymer or a mixture of polymers, for example, PET.

According to variants, the first layer 7 is made of HDPE (high density polyethylene), LDPE (low density polyethylene), PP (polypropylene), EVA (ethylene-vinyl acetate copolymer), EVOH (ethylene vinyl alcohol), PVC (polyvinyl chloride). vinyl), PBT (polybutylene terephthalate), PS (polystyrene), ABS (acrylonitrile butadiene styrene), PMMA (polymethylmethacrylate), PVB (polybutyral vinyl), PA (polyamide), PC (polycarbonate), or PEN (polyethylene naphthalate or polyethylene naphthalate) . . . .

The first layer 7 represents, for example, between 69% and 76% by weight of the film 5.

The first layer 7 has a first melting temperature T1, for example between 245 and 265° C. for the PET (especially for the thermal transfer film).

In the present application, the concept of "melting temperature" should be understood as the melting temperature for semi-crystalline polymers or, more broadly, the glass transition temperature for amorphous polymers.

The second layer 9 comprises, for example, one or more waxes, or one or more resins, and at least one pigment or dye, for example carbon black (especially for the thermal transfer film).

According to variants, the second layer 9 comprises several inks. The second layer 9 represents, for example, between 24% and 31% by weight of the film 5, advantageously about 30%.

The second layer 9 has a second melting temperature T2 less than T1, for example by at least 10° C. In the example shown (and in particular for the thermal transfer film), T2 is between 40 and 90° C.

The third layer 13 forms a "backing" comprising silicone, silicone derivatives or mixtures thereof. The third layer 13 represents, for example, less than 0.3% by weight of the film 5.

Production Method

With reference to FIG. 2, a production method according to the invention is described.

The method makes it possible to convert rolls such as roll 1 in order to produce a densified material in the form of granules of densified material stored in a container 22 for later use, or directly used for different applications.

As a variant, the method makes it possible to transform other rolls of complex films, or other films, such as thin films of organic electronics, for example third generation organic photovoltaic (OPV) films.

The method comprises a step 30 for obtaining the roll 1, a step 40 for separating the tube 3 from the film 5, and a step 50 for feeding an extruder 55 shown in FIGS. 3 to 4) with the film 5. The method also comprises a step 60 of compressing the film 5 to obtain a section 65 of densified material, and an optional step 70 of cutting the section 65 to obtain the granules 20 of densified material.

Steps 30, 40 and 50 together constitute a step of obtaining the film 5.

According to a variant, the film 5 may be obtained in another way, for example in bulk or in the form of pieces (not shown). These pieces are, for example, obtained by shredding the film 5. The shredding may be performed on site, or in another place. The shredding is, for example, carried out using shredders with slow rotation mono-rotor or bi-rotor mills with high-speed knives.

The pieces advantageously have dimensions greater than 1500 µm. According to this variant, the extruder 55 is fed with these pieces and, in the compression step 60, it is these pieces that are densified.

Finally, the method optionally comprises a step 80 of using the granules 20 of densified material so obtained, wherein the use may be carried out immediately or later, on site or in another place.

According to a variant, the section 65 of densified material is sent directly to the step 80 of use without going through the cutting step 70, especially if the use is local and does not require storage in the form of the granules 20 of densified material.

Step 40 of Film-Tube Separation

For "Little Rolls"

The roll 1 may be optionally prepared to be able to unwind freely. If necessary, a cutting tool, for example a cutter or a knife, is used along the length of the width L to release the film 5. This may be done manually or automatically.

By way of example, the rolls are placed manually or automatically in bulk on a grid 87 (FIG. 3) defining passages 89 with dimensions smaller than the dimensions of the tube 3.

A suction system 91, placed below the grid 87, sucks the film 5 and conveys it into a hopper 93 of the extruder 55. The conveying may be, for example, pneumatic.

According to variants not shown, the film 5 may be attracted and unwound by a system generating electrostatic forces, or by an injection or air suction system, such as a air gun system advantageously placed under the grid 87.

According to particular embodiments, the grid 87 may be activated with movements (not shown) of inclination and/or translation relative to the extruder 55, and/or may be mounted on a vibrating table (not shown) to increase the efficiency of the separation.

According to a particular embodiment not shown, the grid 87 may be closed to form a cage around the rolls during separation for reasons of safety.

When the film 5 has been completely unwound from the rollers, the tubes 3 are discarded. The tubes may be, for example, evacuated by tilting the grid 87.

To obtain a continuous supply to the extruder 55, a rotating system (not shown) comprising several indexed grids is advantageously used. Such a system comprises, for example, a grid being filled, two grids located on the suction system, and a grid for evacuation of the tubes. The rotation of the grids is performed when there are only tubes (without film 5) on the two grids that have been positioned on the suction system for the longest period.

In order to maintain continuous operation, the grid being filled is advantageously placed on a weighing system (not shown) in order to introduce a relatively constant weight of rolls per grid.

According to another example (not shown), the rolls are placed on movable unwinders in free rotation about their axes. The film 5 is driven by the worm screw 95 of the extruder 55, or by roller or belt pulling systems, or by suction systems.

The worm screw 95 passes through a sheath 97 defined by the extruder 55 and extends along a screw axis D2.

Advantageously, the film 5 is twisted upon itself in order to facilitate incorporation into the extruder 55.

Another possibility is to place the rolls horizontally (lying down) on a motorized axis. The assembly is placed high relative to the extruder 55. The motorized axis rotates the roll 1 in the unwinding direction of the film 5, which advantageously falls by gravitation.

For the "Jumbo Rolls"

The "Jumbo rolls" are, for example, placed on unwinders to unwind the film 5.

The "Jumbo rolls" are either securely placed on one of their sides, or mounted on a free axis in rotation, or motorized. In order to increase the film input capacity, several "Jumbo rolls" may be advantageously unwound at the same time.

The unwinding of the film is carried out by driving the worm screw of the extruder 55, by means of pulling systems (roller-pulling or belt-pulling system), or by suction systems.

In the latter case, a closed enclosure (not shown) in which the "Jumbo roll" is placed on a free (or motorized) axis in rotation is used. This allows the unwinding of multi-turn "Jumbo rolls" (consisting of several lengths of film not connected together but wound on the same tube) without human intervention.

The film 5 is advantageously twisted upon itself during this step to facilitate incorporation into the extruder 55.

Step 50 of Feeding the Film 5 in the Extruder 55

For example, the film 5 is incorporated by gravitation in the hopper 93 to the worm screw 95 which conveys it by friction.

According to one variant, the suction system (of the pneumatic transport type) conveys the film 5 to the worm screw 95 which conveys it by friction.

Alternatively, the supply may be assisted by a tamping roller (not shown, for example of the same type as those used for the extrusion of rubber) which helps the film 5 to penetrate between the threads 97A of the worm screw 95, wherein the tamping roller rotates at the same speed as the worm screw 95, but in the opposite direction. To this tamping roller are optionally associated two so-called "brush-scrapers" (not shown), placed in an upper and lower position to prevent the film 5 from wrapping itself around the tamping roller.

By "upper" and "lower" is meant here the top and bottom of the figure to which it directly or indirectly refers.

According to a particular embodiment, the feed is assisted by two rollers (not shown) that are mobile in rotation and placed in the hopper 93. These two rollers have different directions of rotation to drive the film 5 down and therefore towards the screw(s) of the extruder 55. The space between these two rollers is large enough to allow the passage of a substantial volume of film 5. To these drive rollers are possibly associated with so-called "brush-scraper" trapping elements positioned in upper and lower positions to prevent the film 5 from wrapping itself around these rollers.

According to a particular embodiment, the supply is assisted by a sliding drawer 98 (FIG. 4) that is hydraulically driven and presses the film 5 against the worm screw 95. In this case, the hopper 93 is not above the worm 95, but is offset perpendicularly to the screw axis D2.

According to another embodiment, and, in particular, for bulk film incorporated in the hopper 93 via a grapple or in the form of bales (obtained during the preliminary packaging of the bulk film by baler-type equipment), the feed is assisted by a vertical piston system (not shown), located at the inlet of the hopper 93 and pushing the film 5 in the worm screw 95 to allow better gripping of the film.

Advantageously, in the feed zone of the extruder 55, the worm screw 95 comprises elements (not shown) making it easier to grip the film 5.

The sheath 97 is advantageously grooved.

Step 60 of Compression

The film 5 is pushed by the worm screw 95 inside the sheath 97 along the screw axis D2 towards a die 99. The film 5 is further compressed in the extruder 55.

The film 5 progressively fills the initially free space between the sheath 97 and the worm screw 95, and is compressed in the sheath 97.

In the example shown, the extruder 55 has a single worm screw.

According to variants not shown, the extruder 55 may be in the form of two co-rotating screws (two screws rotating in the same direction), or contra-rotating screws (two screws rotating in opposing directions.

Optionally, the extruder 55 may be equipped with one or more degassing zones (not shown).

Advantageously, the extruder 55 does not have a distribution grid and/or filtration system. Metal parts (not shown) in the form of empty rings (in order to let the flow of material through) may be optionally placed at the end of the worm screw 95 instead of a grid and/or a filtration system.

The extruder 55 has, for example, a straight head which makes it possible to extend the section in the extension of the axis of the screw D2 or screws.

The sheath 97 is advantageously cylindrical.

The die 99 may be, for example, located in the axial extension of the worm screw 95.

The worm screw 95 may be single or double threaded. The worm screw 95 has an axial length LL, and a nominal diameter DN (thread diameter 97A) that is, for example, constant along the screw axis D2. The worm screw 95 comprises, for example, successively in the axial direction, a portion 101 in which the worm screw has a constant internal diameter D1, and a portion 103 in which the internal diameter increases along the axis of the screw D2 towards the die 99.

Advantageously, the worm screw 95 and the sheath 97 are separated by a distance ES that is greater than or equal to 0.001 times the nominal diameter DN.

The distance ES may be, for example, constant along the screw axis D2.

The portion 101 comprises, for example, cutting elements 105, advantageously located on the radial ends of the threads 97A of the worm screw 95, and adapted to cut the film 5.

The cutting elements 105, possibly in combination with knives (not shown), allow shredding and grinding of the film 5 during its conveyance.

In the portion 103, the height and the volume of the thread(s) 97A of the worm 95 decrease.

A heat input is optionally made to the inside of the sheath 97 to heat the film 5.

Under the combined action of the worm screw 95 and any heat input, the film 5 is compressed through the die 99 to form the densified material in the form of the section 65 of densified material.

Alternatively, the extruder 55 (not shown) may comprise several dies, and possibly several worm screws, while several densified material sections may be obtained at the output of the extruder.

The extruder 55 may be advantageously temperature-controlled, for example, at the sheath 97.

An important parameter is the maximum compression temperature Tm to which the film 5 is heated during the compression step 60.

Tm is lower than the first melting temperature T1.

In addition, it is advantageous for Tm to be between the second melting temperature T2 minus 60° C. and T2 plus 60° C., preferably between T2 minus 35° C. and T2 plus 35° C.

Thus, the second layer 9 advantageously acts as a binder during the densification resulting in the section 65 of densified material. This role of the binder is to ensure and maintain cohesion of the PET and therefore the section of densified material after its exit from the die. The temperature Tm, in particular with respect to T2, thus also seems to be a parameter making it possible to modify the level of hardness desired for the densified material section (hardness defined below).

Advantageously, a temperature setpoint profile of the sheath 97 and the die 99 may be defined, taking into account the self-heating associated with the work of the worm screw 95 and the shearing and frictional forces of the material in the sheath. The temperature setpoint profile depends on the film input capacities, the worm screw rotation speed, and the extruder dimensions (especially the length) along the screw axis D2, and the extruder screw profiles.

The sheath 97 and/or the die 99 are, for example, equipped with a thermal control system 107 for heating and/or cooling the sheath and/or the die.

The system 107 comprises for example:
heating resistive strips (not shown),
a forced-air cooling device (not shown), and/or
a thermal regulation device (not shown) by circulation of fluid (water or oil).

According to a variant not shown, the worm screw 95 is hollow and is cooled with water or oil.

According to another variant, the extruder 55 has an adiabatic operation. It is not equipped with any thermal regulation system, or these only work in a start-up phase of the method. In this case, the heat is provided solely by internal friction in the extruder 55.

For example, the temperature setpoint profile is linear along the axis of screw D2 towards the die 99, and increases, decreases, increases and decreases, or decreases and increases.

According to an advantageous variant, a feed zone 109 (first portion of the worm screw starting at the hopper of the extruder 55) may be cooled in order to avoid feeding problems (for example plugs of material in the feed zone or feed irregularities) and a backflow of the film 5 out of the extruder.

The rotational speed of the worm screw 95 is set as a function of the flow 65 of the desired densified material. However, the higher the rotational speed of the worm screw 95, the more significant is the self-heating, with a risk of exceeding the first melting temperature T1, wherein this risk is lower if control devices are used.

In addition, the rotational speed of the worm screw 95 conditions the residence time of the film 5 in the extruder 55. According to the configuration, a minimum residence time is recommended to give the section 65 of densified material the required properties. Those skilled in the art will know how to adjust the speed of rotation according to these parameters.

The speed of rotation of the worm screw 95 during a filling phase of the sheath 97 is, for example, lower than the speed of rotation during a stabilized production phase. After filling, the speed is then increased more or less quickly.

A co-rotary bi-screw extruder allows regular feeding of the film 5. The use of conical screws allows compression of the film 5 as it is conveyed.

According to one embodiment, the ratio of the length LL to the nominal diameter DN of the worm 95 is, for example, greater than 35, especially if the extruder 55 comprises a thermal control system.

According to another embodiment, the ratio of the length LL to the nominal diameter DN is less than 20 in order to limit the residence time in the extruder 55, especially if the extruder has no thermal regulation system, or the latter is inefficient.

The die 99 gives its shape to the section 65 of densified material at the outlet of the extruder 55.

In FIG. 3, the die 99 has single outlet (a single orifice). Alternatively (not shown), the die 99 may have multiple outlets, as a function of the input film rate and the dimensions of the orifices. The die 99 comprises, for example, a plate with cylindrical holes or a lip plate (rectangular section perpendicular to the screw axis D2).

For example, the diameter of the cylindrical holes or the dimensions of the rectangular sections range from a few millimeters to a few centimeters to produce the densified material sections.

Alternatively, the diameter of the cylindrical hole(s) or the dimensions of the rectangular section are between a few millimeters and several tens of centimeters for direct use of the sections obtained (without cutting).

For the die 99, a compression height is defined as being the ratio of a length LF (FIG. 5) of the die in the direction of extrusion (here confused with the screw axis D2) on the diameter D or width of the orifices in a direction D3 perpendicular to the extrusion direction.

The die 99 advantageously has a compression height of between 1.5 and 15 making it possible to choose and optimize the level of densification desired for the densified material.

The level of densification refers to the level of hardness of the densified material, i.e. its level of resistance to compression and breakage. The desired level of densification is not necessarily the highest possible. In fact for some final applications, it is preferable that the densified material has a low resistance to compression and breakage.

If the compression height is too high, there is a risk that the section 65 of densified material will de-densify after it leaves the extruder 55.

As may be seen in FIG. 5, the die 99 has, for example, in a plane parallel to the extrusion axis, a straight profile (on the left of FIG. 5), a chamfered profile (in the center of FIG. 5) at the input and/or output, or a rounded profile at the input and/or output (right of FIG. 5).

Advantageously, a treatment or a special coating (not shown) of the surface S of the orifices of the die 99 allows better sliding of the section 65 of densified material out of the die.

By way of example, in certain configurations, the die 99 is closed during the filling phase of the extruder 55. As an example, the die 99 itself may be equipped with a temperature control system (not shown) for heating or cooling the section 65 exiting the extruder 55.

Alternatively, it is possible to add other products than the film 5 (or pieces of film) in the extruder 55, such as, for example, one or more thermoplastics, one or more binder additives, one or several compatibilizing additives, one or more antioxidant additives, one or more lubricating additives, one or more dispersant additives, one or more mineral fillers, one or more vegetable fillers, water, or a plurality of impact modifier additives, etc.

Step 70 of Cutting

The section 65 of densified material is cut by a cutting device 111.

The cutting device 111 comprises a cutting tool, for example rotating and mounted at the end of the die (cutting at the head). The cutting tool advantageously comprises rotary knives of hard steel, offering adjustable cutting angles. Advantageously, the cutting takes place at ambient temperature by means of a jet 113 of blown air, wherein the air also serves to convey and to cool the granules 20 so obtained.

According to one variant, shapers (cooled or not) or a cooling conveyor are placed at the outlet of the die 99. After an optional passage via a cooler (not shown), the densified material section(s) is/are incorporated in a granulator-type cutting tool (for example, a shredder-grinder or circular saw) to obtain the granules 20.

After cutting, the granules 20 of densified material are optionally sieved. The smallest particles are advantageously returned to the inlet of the extruder 55 to be incorporated into the section 65 of densified material produced.

Granules 20 of densified material are, for example, packaged in bags to be stored or transported for later use. Granules 20 of densified material may also be stored temporarily in buffer silos.

The section 65 of Densified Material and the Granules 20 of Densified Material The shaped section 65 of densified material or the granules 20 of densified material are ready to be easily incorporated into any method as a raw material.

A section 65 is defined of particular densified material of black color and/or granules of particular densified material of black color, obtained from thermal transfer film comprising black ink.

Specific colored sections 65 (green, red, yellow, blue, white, or gray, in particular) and/or granules 20 of particular densified material (green, red, yellow, blue, white, or gray, in particular) obtained from corresponding color films, are defined.

In a variant, a profile of densified floreal material obtained from thermal transfer films is defined without prior selection of color (the incorporated films may be of any possible color).

The densified material is not classified as hazardous according to Directive 1999/45/EC and complies with the REACH regulation.

Figure 7:
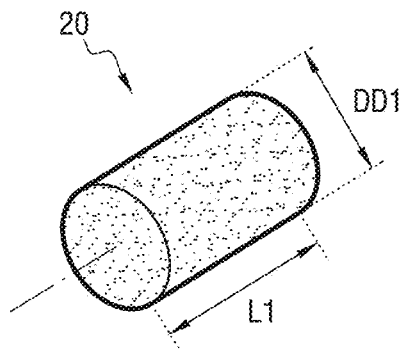

The granules 20 are, for example, in the form of a block (FIG. 6) or a cylinder (FIG. 7).

The properties of the densified material granules obtained are advantageously substantially constant.

The main properties are given in Table 1 below.

The dimensional characteristics (length, diameter, width, dimension) are measured using a vernier caliper.

The melting temperatures are measured using differential scanning calorimetry (DSC) analysis. Density is the mass of matter contained in a given volume including the volume of interstitial air.

Moisture content is measured according to EN 14346-A.

The ash content is measured according to ISO 3451.

The quantity of smallest particles is measured according to the following method. At least three samples of 2 kg minimum are collected. For each sample, the total weight is measured with a scale (minimum accuracy of 0.001 kg), then the smallest particles (having at least two dimensions less than 2 mm—measured by calipers) are manually separated using a small clip. The mass of the smallest particles is then measured with the same scales and the calculation of the mass ratio of the smallest particles to total mass is made. The quantity of smallest particles to be retained is the average of at least three results obtained from three different samples.

TABLE 1

| | Characteristics | Values | Unit |
|---|---|---|---|
| Granules 20 of densified material in the form of cylinders | Length L1 | ≥2 | mm |
| | Diameter DD1 | ≥2 | mm |
| Granules 20 of densified material of blocks | Length L2 | ≥2 | mm |
| | Width LL2 | ≥2 | mm |
| | Height H2 | ≥2 | mm |
| Granules 20 of densified material of another form | Dimension 1 | ≥2 | mm |
| | Dimension 2 (in a direction perpendicular to that of dimension 1) | ≥2 | mm |
| Mass rate of smallest particles (having at least two dimensions less than 2 mm) | | <20 | % |
| Melting point of the PET | | 245-265 | ° C. |
| Ash rate | | <5 | % |
| Humidity level | | <3 | % |
| Bulk density (of bed of granules 20 unpacked or packed) | | >120 | kg/m3 |

Example of Production Method According to the Invention

Complex film rolls are rolls of thermal transfer film of width L between 10 and 120 mm.

To feed the extruder 55, the roller is placed on a free axis. The film is unwound and is driven by the action of the screws of the extruder 55.

The extruder 55 used is a co-rotating twin-screw extruder. The screws have a length of less than 200 mm, a nominal diameter of less than 15 mm, and conjugate profiles (with each other) with a single thread.

The die 99 has a single outlet of rectangular section, and a length LF less than 20 mm.

The extrusion settings are as follows:
screw speed less than 50 rpm,
heating setpoint temperature of the sheath 97 less than 65° C.

For the step 70 of cutting, a pair of scissors was used.

The granules obtained are blocks with dimensions of 4 to 5 mm×3 to 5 mm×2 to 3 mm and an average weight of 35 mg. The bed of granules 20 has an average density (apparent) of between 200 and 400 kg/m$^3$.

Step 80 of Using the Densified Material

The shaped section 65 of densified material or the granules 20 of densified material are used, as a raw material in industrial applications, for example in admixture with other thermoplastic materials, in conventional methods of plastics processing: injection, extrusion compression, extrusion, thermoforming, compression, intrusion . . . etc.

The shaped section 65 of densified material or the granules 20 of densified material are mixed with the other materials and incorporated by means of mixing equipment, for example slow mixers, fast mixers, mixing silos, roll mixers, V-mixers or by metering equipment, for example volumetric or gravimetric.

Example A

The granules 20 of densified material are used in a mixture with other thermoplastic materials, for example polyolefins (HDPE, PP . . . ). Tests carried out by the Applicant have made it possible to validate the feasibility of transformation by extrusion and injection of a mixture containing, by weight, for example, 10% of granules, 20% of densified material and 90% of polyolefin material.

The characteristics of the polymer mixture (or compound) obtained (see Table 2 below) are equivalent to that of polyolefins alone in terms of rheological, physicochemical and mechanical properties.

TABLE 2

Characterization of the compound "granules 20 of densified material + 90% HDPE"

| Characteristics | 10% Granules 20 of densified material + 90% HDPE | 100% HDPE | Unit | Standard |
|---|---|---|---|---|
| MFI (190° C., 2.16 kg) | 4.7 ± 0.5 | 5.2 ± 0.5 | g/10 min | ISO 1133 |
| Ash rate | ≤5 | ≤ | 5% | Internal |
| Density | 0.97 ± 0.02 | 0.95 ± 0.02 | g/cm$^3$ | Internal |
| Melting temperature | 125-130 | 125-130 | ° C. | Internal |
| Traction Module | 1100 ± 200 | 1070 ± 200 | MPa | ISO 527 |
| Maximum stress (Traction) | 28 ± 3 | 27 ± 3 | MPa | ISO 527 |
| Elongation at break (Traction) | 333 ± 50 | 355 ± 50 | % | ISO 527 |

Example B

Granules 20 of densified material are used in plastics as a black masterbatch (or as color masterbatch according to the references). The granules 20 are therefore a recycled masterbatch capable of substituting for virgin masterbatches.

Many tests carried out by the Applicant have validated this use as a black or colored masterbatch.

In particular, the tests have made it possible to determine that the addition of granules 20 of black-colored densified material in a natural thermoplastic material makes it possible to obtain a black coloration of quality when the granules represent at least 0.5% by weight of the product to be colored.

OTHER EXAMPLES

For example, the granules 20 of densified material (or the section 65 of densified material) are/is used in plastics as a filler in a thermoplastic matrix shaped by injection, extrusion compression, extrusion, thermoforming, compression, intrusion, etc.

According to another example, the granules 20 of densified material (or the sections 65 of densified material) are used in plastics as additives in a mixture of thermoplastics that are initially little or not compatible, in order to improve the compatibility of the components of the mixture with each other. By way of illustration, tests have shown that the granules 20, thanks to the inks they contain, improve the compatibility between HDPE and PET by a factor of 10 relative to a mixture without this additive.

According to another example, the granules 20 of densified material (or the sections 65 of densified material) are used in plastics to modify the viscosity in a thermoplastic matrix shaped by injection, extrusion compression, extrusion, thermoforming, compression, intrusion, . . . etc.

According to another example, the granules 20 of densified material (or the sections 65 of densified material) are used as fillers or raw materials within a thermosetting matrix (for example compression-formed, or by RIM injection molding), an elastomeric matrix or a rubber-based matrix.

In another example, the granules 20 of densified material (or the sections 65 of densified material) are used in other sectors such as:
- loads or raw materials during the manufacture of concrete, cements, asphalt, bitumen, ceramic products, etc.,
- raw materials in the manufacture of thermal or acoustic insulation,
- filler for filling empty spaces, or
- raw materials in the manufacture of cushioning products.

According to a last example, the granules 20 of densified material (or the sections 65 of densified material) are used in plastics as release agents in a thermoplastic matrix shaped by injection, extrusion compression, extrusion, thermoforming, compression, intrusion . . . etc.

ADVANTAGES

Thanks to the features described above, the invention provides an improved method for producing densified material that may be used directly in the form of granules of densified material or of one or more densified material profiles from complex film wastes, and, in particular, from thermal transfer film, while limiting the number of steps in order to encourage recycling, as well as possible uses of the densified material obtained.

Thanks to the use of at least one worm screw, it is possible, according to an advantageous embodiment, to feed the extruder 55 directly with the film 5, without preliminary shredding/grinding. It is also possible to directly incorporate the section 65 of densified material in the final application methods without the step 70 of prior cutting.

The method according to the invention makes it possible to transform and use films having a very high ink content, even when the inked waste is used alone, and allows, for example, these inks to be used as binders during the step of compression.

In the context of their research, the Applicant has tested uses of granules 20 of densified material or of the section 65 of densified material obtained, mixed with other thermoplastics. It has been found, for example, that processing is technically feasible when the densified material of a suitable particle size, is mixed with other thermoplastics.

The method is particularly suitable for thermal transfer film waste (presence of cardboard tubes, very low film thickness, strongly inked film).

The steps of separating the tubes from the rolls, compressing them, possibly cutting them and using the densified material obtained as a raw material in a final application, may be advantageously carried out on the same production line.

The granules 20 of densified material have a particle size and bulk density facilitating their packaging, transport and implementation in conventional transformation methods of the plastics industry (injection, extrusion . . . ).

The densified material may be used in many applications, in particular as a mixture in polyolefin materials or in other thermoplastics without loss of properties with incorporation rates of up to 10% by weight of densified material, or as a black or colored, recycled masterbatch to replace blank masterbatches.

The invention claimed is:

1. A method for producing a densified material, wherein the method comprises at least the following steps:
  obtaining a film comprising at least a first layer of PET, and a second layer of ink, wherein the first layer has a first melting temperature, or obtaining pieces of such a film, and
  compressing the film or pieces of film so obtained, through at least one die of at least one extruder, and obtaining at least one section of densified material, wherein the extruder comprises at least one rotary worm screw for pushing the film or the pieces of film obtained along a screw axis relative to the extruder,
  wherein the compression step is performed at a maximum compression temperature of the film or pieces of film so obtained, wherein the maximum compression temperature is lower than the first melting temperature.

2. The method according to claim 1, wherein the second layer has a second melting temperature less than or equal to the first melting temperature, wherein the temperature of the compression step is between the second melting temperature minus 60° C. and the second melting temperature plus 60° C.

3. The method according to claim 2, wherein the second melting temperature is less than the first melting temperature by at least 10° C.

4. The method according to claim 2, wherein the temperature of the compression step is between the second melting temperature minus 35° C. and the second melting temperature plus 35° C.

5. The method according to claim 2, wherein the worm screw is part of a system of the extruder with two conical screws.

6. The method according to claim 1, wherein the worm screw comprises:
  at least one cutting element for cutting the film or the pieces of film so obtained, and/or
    at least a portion in which the worm screw has an internal diameter perpendicular to the screw axis, the internal diameter increasing along the screw axis for compressing, during the densification step, the film or the pieces of film so obtained.

7. The method according to claim 6, wherein the worm screw is part of a system of the extruder with two conical screws.

8. The method according to claim 1, wherein the worm screw is part of a system of the extruder with two conical screws.

9. The method according to claim 1, wherein the die has a compression height of between 1.5 and 15.

10. The method according to claim 1, wherein the extruder defines a sheath traversed by the worm screw, wherein the worm screw has a nominal diameter, and threads separated from the sheath by a distance greater than or equal to 0.001 times the nominal diameter.

11. The method according to claim 1, further comprising the steps of:
  obtaining the film by unwinding a roll, wherein the unwinding is carried out through suction of the film or by direct drive of the film by the worm screw, and
  continuous feeding of the extruder with the film.

12. The method according to claim 1, further comprising incorporating:
  said at least one section of densified material, or granules as:
    a. dye for a thermoplastic material,
    b. load within a thermoplastic matrix,
    c. raw material in the formulation of thermosets,
    d. raw material in concrete, cement, bitumen, or paint,
    e. raw material in the production of cushioning products,
    f. filler for filling material of an empty space,
    g. release agent in a thermoplastic matrix,
    h. compatibilizing agent in a mixture of thermoplastic materials to increase the compatibility of the materials with each other, or
    i. viscosity modifier within a thermoplastic matrix.

13. The method according to claim 1, further comprising cutting said at least one section of densified material in order to obtain granules of densified material.

14. A plant for producing a densified material, wherein the plant comprises:
  a source of a film or pieces of film, wherein the film comprises at least a first layer of PET, and a second layer of ink, wherein the first layer has a first melting temperature, and
  at least one extruder that is designed to compress the film or the pieces of film, wherein the extruder comprises at least one exit die for at least one section of densified material, and at least one rotary worm screw for pushing the film or pieces of film along a screw axis with respect to the die, wherein the extruder is designed to effect compression at a maximum compression temperature of the film or pieces of film, wherein the maximum compression temperature is lower than the first melting temperature.

* * * * *